(12) United States Patent
Hirayama

(10) Patent No.: US 7,460,919 B2
(45) Date of Patent: Dec. 2, 2008

(54) MUSIC CONTENTS REPRODUCING APPARATUS

(75) Inventor: Ikuo Hirayama, Tokyo (JP)

(73) Assignee: Panasonic Corporation, Osaka (JP)

( * ) Notice: Subject to any disclaimer, the term of this patent is extended or adjusted under 35 U.S.C. 154(b) by 96 days.

(21) Appl. No.: 10/592,405

(22) PCT Filed: Sep. 12, 2005

(86) PCT No.: PCT/JP2005/016729

§ 371 (c)(1),
(2), (4) Date: Sep. 11, 2006

(87) PCT Pub. No.: WO2006/038429

PCT Pub. Date: Apr. 13, 2006

(65) Prior Publication Data

US 2007/0274546 A1    Nov. 29, 2007

(30) Foreign Application Priority Data

Sep. 30, 2004    (JP)    ............... 2004-287927

(51) Int. Cl.
G06F 17/00    (2006.01)
H04B 1/00    (2006.01)

(52) U.S. Cl. ............... 700/94; 381/56; 381/86; 381/107; 381/302

(58) Field of Classification Search ............ 381/302, 381/71.4, 86, 107, 365, 389, 56; 700/94
See application file for complete search history.

(56) References Cited

U.S. PATENT DOCUMENTS

| | | | |
|---|---|---|---|
| 5,661,811 A * | 8/1997 | Huemann et al. | ........... 381/309 |
| 6,201,176 B1 | 3/2001 | Yourlo | |
| 6,330,337 B1 * | 12/2001 | Nicholson et al. | ............. 381/86 |
| 7,003,515 B1 * | 2/2006 | Glaser et al. | ................... 707/5 |
| 7,279,629 B2 * | 10/2007 | Hinman et al. | ................ 84/615 |
| 2002/0172372 A1 | 11/2002 | Tagawa et al. | |
| 2003/0060954 A1 | 3/2003 | Kobata et al. | |
| 2004/0003706 A1 | 1/2004 | Tagawa et al. | |

FOREIGN PATENT DOCUMENTS

| | | |
|---|---|---|
| DE | 197 46 525 A1 | 4/1999 |
| EP | 0 766 495 A2 | 4/1997 |
| JP | 05-345549 | 12/1993 |
| JP | 08-289389 A | 11/1996 |
| JP | 11-272159 A | 10/1999 |

(Continued)

OTHER PUBLICATIONS

Japanese Search Report for Application No. PCT/JP2005/016729, dated Dec. 13, 2005, with English translation thereof.

(Continued)

Primary Examiner—Suhan Ni
Assistant Examiner—Jesse A Elbin
(74) Attorney, Agent, or Firm—RatnerPrestia

(57) ABSTRACT

A contents reproduction control portion uses feature quantity data about feature quantities of pieces of music and an interference degree table which defines degrees of interference among the feature quantities. In this manner, interference music to be output from between front-seat speakers and music to be output from rear-seat speakers is at least partially avoided.

9 Claims, 7 Drawing Sheets

SORT TABLE

| FEATURE PARAMETER | MUSIC 1 | MUSIC 2 | MUSIC 3 | MUSIC K | MUSIC N |
|---|---|---|---|---|---|
| VIOLENCE | 1.0 | 0.0 | | : | |
| RHYTHMICITY | 0.5 | 0.2 | | : | |
| FRESHNESS | 0.1 | 0.5 | | : | |
| SIMPLICITY | 0.2 | 0.7 | | : | |
| : | | | | : | |
| FEATURE i | ... | ... | ... | $\alpha(i, k)$ | |
| | | | | | |
| SOFTNESS | 0.0 | 1.0 | | | |

FOREIGN PATENT DOCUMENTS

| | | |
|---|---|---|
| JP | 2000-021144 A | 1/2000 |
| JP | 2000-035796 A | 2/2000 |
| JP | 2000-207845 A | 7/2000 |
| JP | 2001-312285 A | 11/2001 |
| JP | 2002-278547 A | 9/2002 |
| JP | 2003-084774 A | 3/2003 |
| JP | 2003-089330 A | 3/2003 |
| JP | 2003-099462 A | 4/2003 |
| JP | 2004-086189 A | 3/2004 |

OTHER PUBLICATIONS

Supplementary European Search Report for EP 05 78 2381, dated Jul. 2, 2008.

* cited by examiner

FIG. 2

SORT TABLE

| FEATURE PARAMETER | MUSIC 1 | MUSIC 2 | MUSIC 3 | MUSIC K | MUSIC N |
|---|---|---|---|---|---|
| VIOLENCE | 1.0 | 0.0 | | : | |
| RHYTHMICITY | 0.5 | 0.2 | | : | |
| FRESHNESS | 0.1 | 0.5 | | : | |
| SIMPLICITY | 0.2 | 0.7 | | : | |
| : | | | | : | |
| FEATURE i | ... | ... | ... | $\alpha(i, k)$ | |
| | | | | | |
| SOFTNESS | 0.0 | 1.0 | | | |

FIG. 3

| FEATURE QUANTITY | SIGN | SUMMARY |
|---|---|---|
| DEGREE OF SPECTRAL CHANGE | SF | DEGREE OF SPECTRAL CHANGE BETWEEN FRAMES |
| AVERAGE NUMBER OF PRONOUNCED SOUNDS | AR | FREQUENCY OF SOUNDS PRONOUNCED IN MUSIC |
| NON-PERIODICITY OF PRONOUNCED SOUNDS | NZ | NON-PERIODICITY OF SOUNDS PRONOUNCED IN MUSIC |
| BEAT PERIOD | TT | TIME LENGTH CORRESPONDING TO QUARTER NOTE IN MUSIC |
| BEAT PERIOD RATIO | BR | RATIO BETWEEN PERIOD OF SOUND CORRESPONDING TO QUARTER NOTE IN MUSIC AND SOUND PRONOUNCED PREDOMINANTLY |
| BEAT INTENSITY 1 | BI1 | INTENSITY OF SOUND PRONOUNCED IN PERIOD CORRESPONDING TO APPROXIMATELY HALF OF BEAT PERIOD |
| BEAT INTENSITY 2 | BI2 | INTENSITY OF SOUND PRONOUNCED IN PERIOD CORRESPONDING TO APPROXIMATELY QUARTER OF BEAT PERIOD |
| BEAT INTENSITY RATIO | IR | RATIO BETWEEN BEAT INTENSITY 1 AND BEAT INTENSITY 2 |

FIG. 4

INTERFERENCE DEGREE TABLE

| | VIOLENCE | RHYTHMICITY | | FEATURE j | | SOFTNESS |
|---|---|---|---|---|---|---|
| VIOLENCE | 1.0 | | | : | | 0.0 |
| RHYTHMICITY | 0.5 | 1.0 | | : | | |
| FRESHNESS | 0.1 | 0.8 | | : | | |
| SIMPLICITY | 0.2 | | | : | | |
| : | | | | : | | |
| FEATURE i | ... | ... | ... | F (i, j) | | |
| | | | | | | |
| SOFTNESS | 0.0 | 0.2 | | | | |

FIG. 7

VEHICLE VELOCITY INFLUENCE DEGREE TABLE

|  | PARKED | UP TO 8 km/h | UP TO 50 km/h | UP TO 90 km/h | UP TO 110 km/h | 111 km/h OR HIGHER |
|---|---|---|---|---|---|---|
| VIOLENCE | 1.0 | 0.8 | 0.6 | 0.4 | 0.2 | 0.0 |
| RHYTHMICITY | 1.0 |  |  | : |  |  |
| FRESHNESS | 1.0 | 1.0 | 0.9 | : |  |  |
| SIMPLICITY | 1.0 |  |  | : |  |  |
| : |  |  |  | : |  |  |
| FEATURE i | ... | ... | ... | S (i) |  |  |
|  |  |  |  |  |  |  |
| SOFTNESS | 1.0 | 0.2 |  |  |  |  |

MUSIC CONTENTS REPRODUCING APPARATUS

This application is a U.S. National Phase Application of PCT International Application PCT/JP2005/016729.

TECHNICAL FIELD

The present invention relates to a music contents reproducing apparatus to be mounted in a vehicle or the like.

BACKGROUND ART

Some of music contents reproducing apparatuses to be mounted in vehicles such as cars are designed to be able to reproduce different music contents for front seats and rear seats. When different music contents for front seats and rear seats are reproduced in such an apparatus, headphones or earphones are used.

On the other hand, there has been proposed a technique called a sound image localization system, in which music can be listened to without use of headphones or the like (e.g. see Patent Document 1). According to this technique, parametric speakers are disposed in the back surface of a front seat so as to form a sound space with directivity in a head portion of a rear seat. This technique can limit a sound extent to some extent.

Patent Document 1: JP-A-5-345549

DISCLOSURE OF THE INVENTION

Problems that the Invention is to Solve

However, when different music contents are reproduced in the front seat and the rear seat by use of the sound image localization system, some kinds of music reproduced in the front seat and the rear seat respectively may give influence to each other or from one to the other. For example, when classical music is reproduced in the front seat and rock music is reproduced in the rear seat, interference occurs to make it difficult to listen to the music. When pieces of music belonging to one and the same category or violent pieces of music are reproduced, it may be difficult to listen to the pieces of music subjectively.

The present invention was developed in consideration of the foregoing situation. An object of the invention is to provide a music contents reproducing apparatus which can reproduce a plurality of pieces of music contents without causing interference with each other.

Means for Solving the Problems

According to the present invention, there is provided a control unit for controlling which piece of music contents to be output to one output portion in accordance with music contents to be output to another output portion using physical quantity data about physical quantities of respective pieces of music contents and a table which defines degrees of interference among the physical quantities. According to this configuration, music contents to be output to one output portion and music contents to be output to another output portion are selected using the interference table which defines degrees of interference among physical quantities of respective pieces of music contents. Thus, a plurality of pieces of music contents can be reproduced without causing interference with each other.

Effect of the Invention

According to the present invention, music contents to be output to one output portion and music contents to be output to another output portion are selected using an interference table which defines degrees of interference among physical quantities of respective pieces of music contents. Thus, a plurality of pieces of music contents can be reproduced without causing interference with each other.

BRIEF DESCRIPTION OF THE DRAWINGS

FIG. 2 A table showing an example of a sort table for use in the music contents reproducing apparatus according to the first embodiment.

FIG. 3 A table for explaining music contents feature extraction technology.

FIG. 4 A table showing an example of an interference degree table for use in the music contents reproducing apparatus according to the first embodiment.

FIG. 7 A table showing an example of a velocity influence degree table for use in the music contents reproducing apparatus according to the second embodiment.

DESCRIPTION OF REFERENCE NUMERALS

Figure 1:
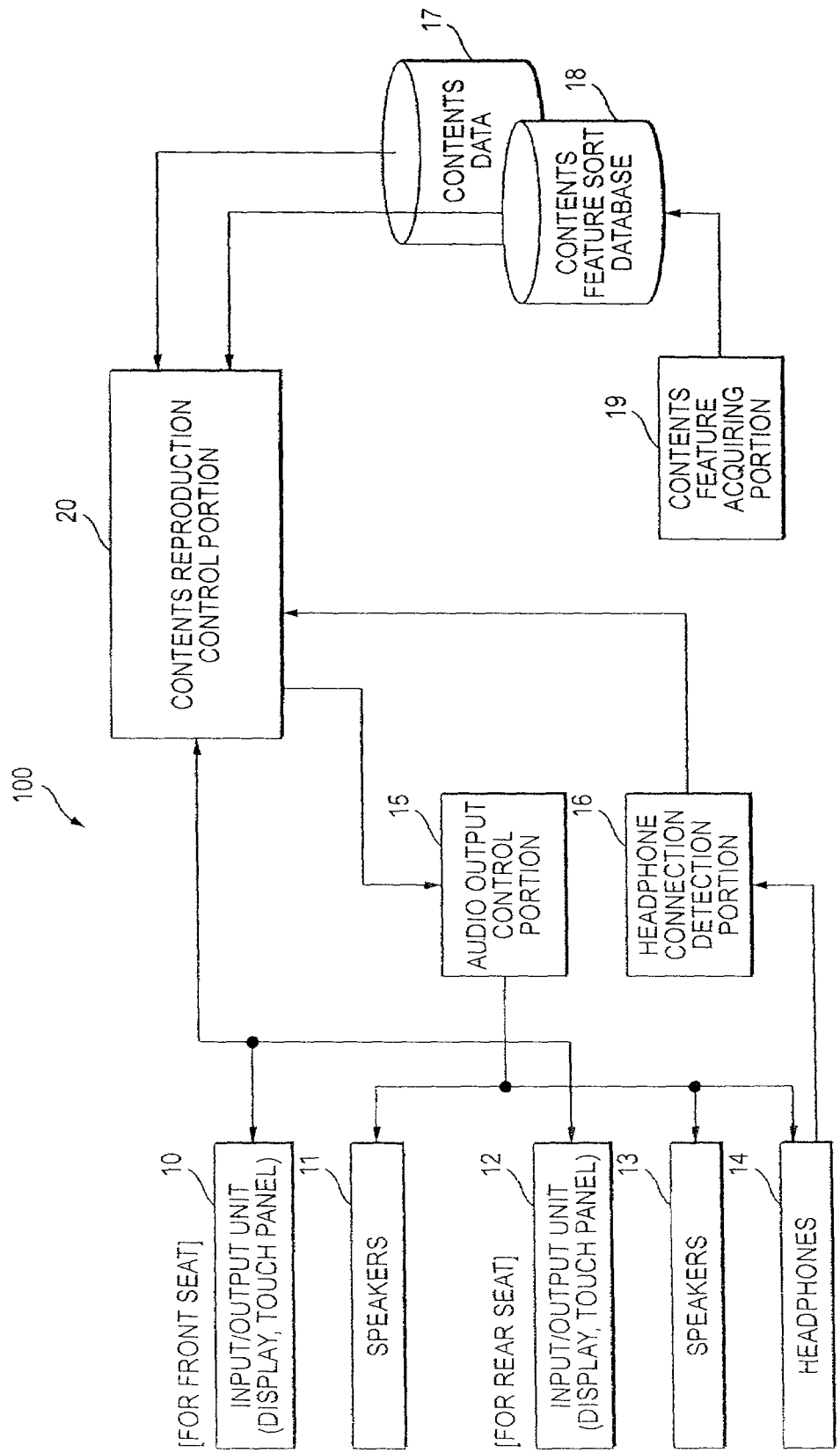
FIG. 1 A block diagram showing the schematic configuration of a music contents reproducing apparatus according to a first embodiment of the present invention.

100,200 music contents reproducing apparatus
10,12 input/output unit
11,13 speakers
14 headphones
15 audio output control portion
16 headphones connection detection portion
17 contents data storage portion
18 contents feature sort database
19 contents feature acquiring portion
20,20B contents reproduction control portion
21 running state acquiring portion

BEST MODE FOR CARRYING OUT THE INVENTION

First Embodiment

FIG. 1 is a block diagram showing the schematic configuration of a music contents reproducing apparatus according to the first embodiment of the present invention. In FIG. 1, a music contents reproducing apparatus 100 according to this embodiment has a front-seat input/output unit 10, front-seat speakers 11, a rear-seat input/output unit 12, rear-seat speakers 13, rear-seat headphones 14, an audio output control portion 15, a headphones connection detection portion 16, a contents data storage portion 17, a contents feature sort database 18, a contents feature acquiring portion 19 and a contents reproduction control portion 20.

The front-seat input/output unit 10 has a display, a touch panel, etc. The front-seat input/output unit 10 inputs operation for activating each function of this apparatus 100 in a front seat, indication of the status of the input operation, indication of the status of execution of the function, etc. The front-seat speakers 11 perform sound output on the front seat side. The rear-seat input/output unit 12 has a display, a touch panel, etc. The rear-seat input/output unit 12 inputs operation for activating each function of this apparatus 100 in a rear seat, indication of the status of the input operation, indication of the status of execution of the function, etc. The rear-seat speakers 13 perform sound output on the front seat side. The rear-seat headphones 14 are used when music contents are listened to on the rear seat side.

The audio output control portion 15 controls supply of sound signals to the front-seat speakers 11, the rear-seat speakers 13 and the headphones 14. When a piece of music should be reproduced on the front seat side, the audio output control portion 15 supplies a sound signal of the piece of music to the front-seat speakers 11. When a piece of music should be reproduced on the rear seat side, the audio output control portion 15 supplies a sound signal of the piece of music to the rear-seat speakers 13 or the headphones 14. When the headphones 14 are not used, the sound signal of the piece of music to be reproduced on the rear seat side is supplied to the rear-seat speakers 13. When the headphones 14 are used, the sound signal of the piece of music is supplied to the headphones 14.

The headphones connection detection portion 16 detects the connection of the headphones 14 to an audio output terminal (not shown) of the apparatus body. The headphones connection detection portion 16 inputs a headphones detection signal to the contents reproduction control portion 20 when the headphones connection detection portion 16 detects the connection of the headphones 14. The contents data storage portion 17 stores music contents ripped from recording media such as DVDs, CDs, etc. or music contents acquired by receiving TV broadcasts or radio broadcasts. The contents feature sort database 18 stores a sort table showing combinations of a plurality of pieces of music contents. The sort table is created when music contents are registered in the contents data storage portion 17.

FIG. 2 is a table showing an example of the sort table. In FIG. 2, music (music contents) and features of the music are registered in the form of normalized values ranging from 0 to 1. In Music 1, for example, a parameter indicating violence is "1.0", a parameter indicating rhythmicity is "0.5", a parameter indicating freshness is "0.1", a parameter indicating simplicity is "0.2", and a parameter indicating softness is "0.0". In Music 2, a parameter indicating violence is "0.0", a parameter indicating rhythmicity is "0.2", a parameter indicating freshness is "0.5", a parameter indicating simplicity is "0.7", and a parameter indicating softness is "1.0".

The sort table is created by use of CDDB (CD DataBase) or contents feature extraction technology. The sort table shows a plurality of features of music contents. CDDB is a database for providing users with information about music recorded on music CDs or music/video DVDs. For use of CDDB, the music contents reproducing apparatus 100 is designed to have a function of gaining access to the Internet.

The contents feature extraction technology, for example, includes the technique disclosed in JP-A-2002-278547. According to JP-A-2002-278547, eight physical feature quantities shown in FIG. 3 are extracted from an input sound signal, and the extracted feature quantities are converted into impression values, that is, numerical quantities expressing subjective impressions of each piece of music by Expression (1).

$$I_i = \sum_{j=1}^{N_P} W_{ij} \cdot P_j \qquad \text{[Expression 1]}$$

In Expression (1), Ii designates an impression value with respect to an impression factor i, Pj designates a value of a feature quantity j, and Wij designates a weighting factor indicating the relation between the feature quantity j and the impression factor i. The impression value Ii is a numerical quantity indicating the subjective impression of a piece of music. The impression value Ii is used as a numerical quantity integrating degrees (referred to as Ej) of impressions which can be expressed by specific adjectives. When, for example, the impression of a piece of music is expressed by degrees from five aspects "violence (E1)", "rhythmicity (E2)", "freshness (E3)", "simplicity (E4)" and "softness (E5)", Ii can be obtained from Ej by Expression (2).

$$I_j = \sum_{j=1}^{N_i} Y_{ij} \cdot E_j \qquad \text{[Expression 2]}$$

Return to FIG. 1 again. The contents feature acquiring portion 19 acquires the features (violence, rhythmicity, freshness, simplicity, softness, etc.) of music contents registered in the contents data storage portion 17. The features of the music contents acquired by the contents feature acquiring portion 19 are registered in the aforementioned sort table.

The contents reproduction control portion 20 has a function to output Music N, which will hardly interfere with Music 1 to be output to the front speakers, to the rear-seat speakers using feature quantity data about the feature quantities of Music 1 and an interference degree table which defines the degree of interference among feature quantities. The contents reproduction control portion 20 is constituted by a not-shown CPU (Central Processing Unit), a ROM storing programs for controlling the CPU, a RAM to be used in the operation of the CPU, etc.

When an operation to reproduce music contents is performed by the front-seat input/output unit 10 in the state where the music contents have been stored in the contents data storage portion 17, the contents reproduction control portion 20 reads the music contents from the contents data storage portion 17 and inputs the music contents into the audio output control portion 15 together with a selection signal for selecting the front-seat speakers 11. When an operation to reproduce music contents is performed by the rear-seat input/output unit 12 in the state where no music contents are being reproduced on the front-seat side, the contents reproduction control portion 20 reads the music contents from the contents data storage portion 17 and inputs the music contents into the audio output control portion 15 together with a selection signal for selecting rear-seat speakers 13. In this event, when a headphones detection signal has been beforehand input from the headphones connection detection portion 16, the contents reproduction control portion 20 inputs a selection signal for selecting the headphones 14 to the audio output control portion 15. When a headphones detection signal is input in the middle of selection of the rear-seat speakers 13, the contents reproduction control portion 20 changes the devices from the speakers 13 to the headphones 14.

The contents reproduction control portion 20 uses the headphones connection detection portion 16 to determine whether the headphones 14 are connected or not. When the headphones 14 are connected, the contents reproduction control portion 20 cancels the selection of the music contents to be output to the front seat or the rear seat. When the headphones 14 are not connected, the contents reproduction control portion 20 carries out the selection. The contents reproduction control portion 20 refers to the sort database to obtain the degree of interference of music contents selected on the front seat side with other music contents stored in the contents data storage portion 17. After obtaining the degree of interference with any other music contents, the contents reproduction control portion 20 will cancel the selection of the music contents if the degree of interference of the music contents exceeds a predetermined threshold value.

The degree of interference is obtained by Expression (3) in this embodiment.

$$\text{Degree of Interference } (m, n) = \sum_{i,j=1}^{N} F(i, j) \times \alpha(i, m) \times \alpha(j, n) \quad \text{[Expression 3]}$$

In Expression (3), m and n designate pieces of music, F(i,j) designates an influence ratio of a feature quantity, $\alpha(i,m)$ designates a feature quantity of the piece of music m, and $\alpha(j,n)$ designates a feature quantity of the piece of music n. The influence ratio F(i,j) of the feature quantity is obtained from the interference degree table shown in FIG. 4. The interference degree table expresses the influence ratio F(i,j) of the feature quantity between the two pieces of music. In the case of FIG. 4, the influence ratio between "violence" and "violence" is "1.0" indicating 100%, the influence ratio between "violence" and "rhythmicity" is "0.5" indicating 50%, the influence ratio between "violence" and "freshness" is "0.1" indicating 10%, the influence ratio between "violence" and "simplicity" is "0.2" indicating 20%, and the influence ratio between "violence" and "softness" is "0.0" indicating 0%. The interference degree table may be stored in the contents reproduction control portion 20, or may be stored in the contents data storage portion 17 or the contents feature sort database 18.

In the sort table shown in FIG. 2, each feature parameter of one piece of music is multiplied by all of feature parameters of the other piece of music. Each multiplication result is multiplied by the influence ratio FF(i,j) of the corresponding feature quantity in the interference degree table. Thus, the degree of interference between the two pieces of music is obtained. For example, in the case of Music 1 and Music 2 in the sort table of FIG. 2, the degree of interference is obtained as follows.

$$j = 1$$
$$i = 1, 2, 3, \ldots$$
$$F(1, 1) \times \alpha(1, 1) \times \alpha(1, 2) \rightarrow 1.0 \times 1.0 \times 0.0$$
$$F(2, 1) \times \alpha(2, 1) \times \alpha(1, 2) \rightarrow 0.5 \times 0.5 \times 0.0$$

-continued
$$F(3, 1) \times \alpha(3, 1) \times \alpha(1, 2) \rightarrow 0.1 \times 0.1 \times 0.0$$
$$F(4, 1) \times \alpha(4, 1) \times \alpha(1, 2) \rightarrow 0.2 \times 0.2 \times 0.0$$
$$\vdots$$
$$j = 2$$
$$i = 1, 2, 3, \ldots$$
$$F(1, 2) \times \alpha(1, 1) \times \alpha(2, 2) \rightarrow F(1, 2) \text{ has no value}$$
$$F(2, 2) \times \alpha(2, 1) \times \alpha(2, 2) \rightarrow 1.0 \times 0.5 \times 0.2$$
$$F(3, 2) \times \alpha(3, 1) \times \alpha(2, 2) \rightarrow 0.8 \times 1.0 \times 0.2$$
$$F(4, 2) \times \alpha(4, 1) \times \alpha(2, 2) \rightarrow F(4, 2) \text{ has no value}$$
$$\vdots$$

In such a manner, the degree of interference between two pieces of music is obtained.

Figure 5:
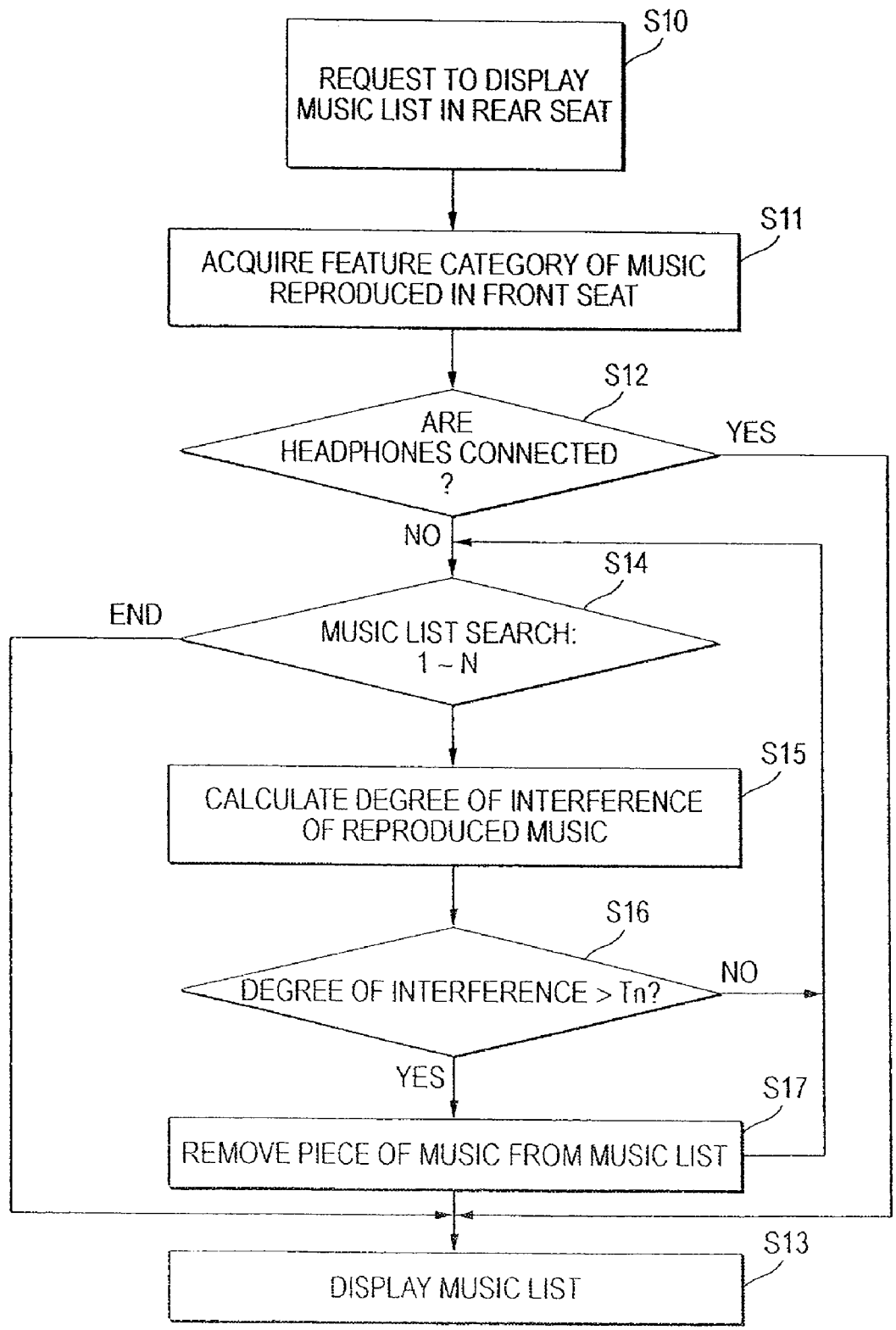
FIG. 5 A flow chart for explaining the operation of the music contents reproducing apparatus according to the first embodiment.

FIG. 5 is a flow chart showing a process for removing pieces of music causing interference. When there is a music list display request from the rear seat (Step S10), the feature quantities of a piece of music reproduced in the front seat are acquired (Step S11). Next, whether the headphones 14 are connected or not is determined based on whether there is a headphones detection signal from the headphones connection detection portion 16 (Step S12). When the headphones 14 are connected, a music list is displayed without being edited (Step S13). On the contrary, when the headphones 14 are not connected, searching the music list is started (Step S14). First, the degree of interference between Music 1 included in the music list and the piece of music reproduced in the front seat is calculated (Step S15).

Next, it is determined whether the calculated degree of interference is a value exceeding a predetermined threshold value Th or not (Step S16). When the calculated degree of interference is not larger than the threshold value Th, the routine of processing returns to Step S14. When the calculated degree of interference is not smaller than the threshold value Th, Music 1 is removed from the music list (Step S17). Thus, the aforementioned process of Steps S14 to S17 is repeated on each selected piece of music. Pieces of music whose degree of interference exceeds the threshold value Th are removed from the music list. Thus, an edited music list is created. The created music list is output to the rear-seat input/output unit 12 and displayed on a display (Step S13).

According to the music contents reproducing apparatus in this embodiment, when a plurality of pieces of music contents to be reproduced simultaneously in the front seat and the rear seat are selected, music contents causing no interference with each other can be selected with reference to the interference degree table.

In the aforementioned embodiment, when a piece of music which is being reproduced is changed to another piece of music in the middle without listening to the end in either the front seat or the rear seat, interference may be caused by the changed piece of music. When such a state is detected with reference to the degrees of interference among respective pieces of music contents, the interference can be reduced by narrowing only the volume for reproduction of the changed piece of music contents or both the volumes for reproduction of the two pieces of music contents.

Second Embodiment

Figure 6:
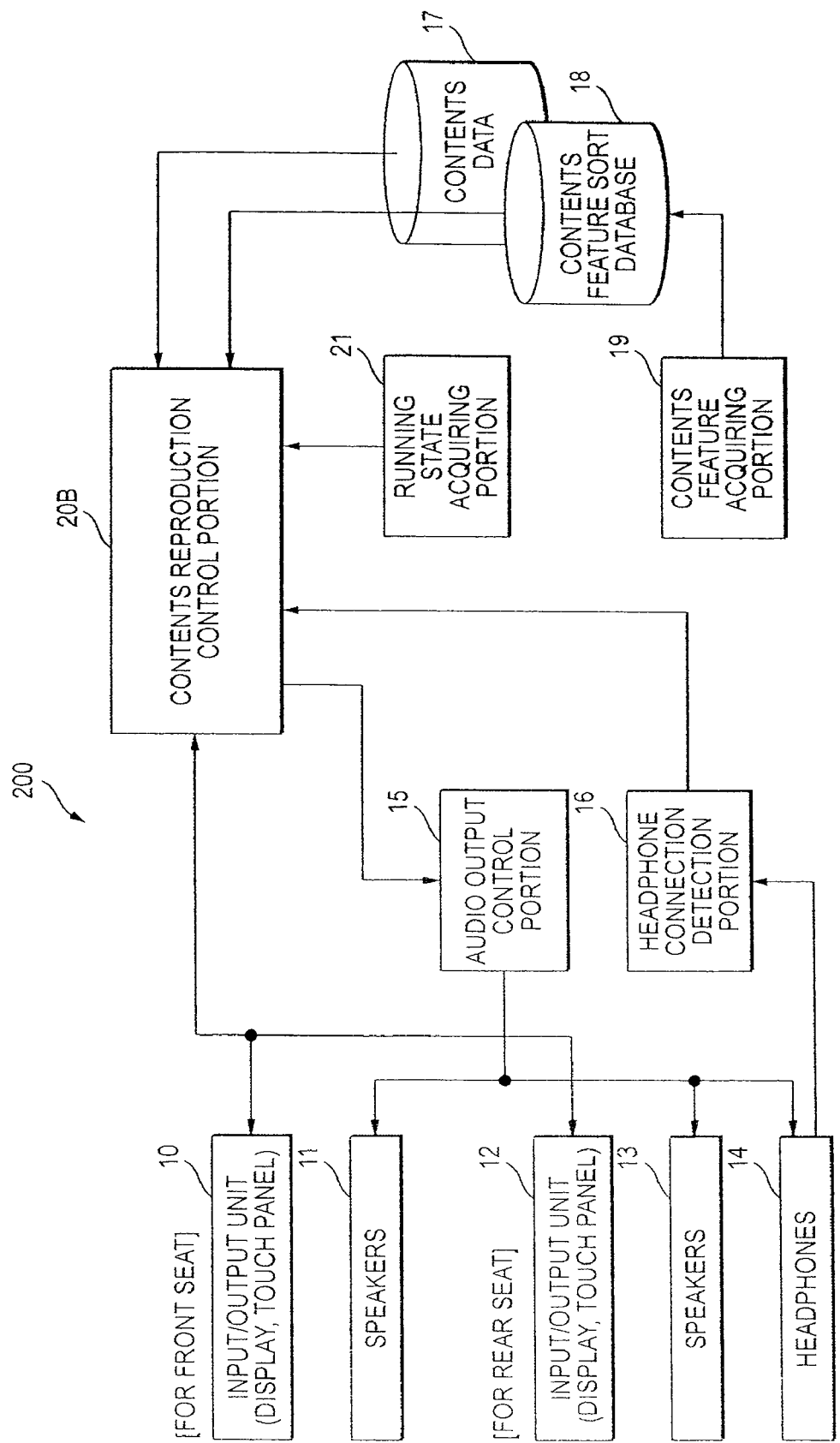
FIG. 6 A block diagram showing the schematic configuration of a music contents reproducing apparatus according to a second embodiment of the present invention.

FIG. 6 is a block diagram showing the schematic configuration of a music contents reproducing apparatus according to the second embodiment of the present invention. In FIG. 6, a music contents reproducing apparatus 200 according to this embodiment is the same as the aforementioned music contents reproducing apparatus according to the first embodiment, except that the music contents reproducing apparatus 200 includes a running state acquiring portion 21 for acquiring the running state of a vehicle mounted with this apparatus.

For example, the running state acquiring portion 21 regards the vehicle as parked when the vehicle velocity is not higher than 8 km/h and the parking brake of the vehicle is applied. The running state acquiring portion 21 regards the vehicle as running when the vehicle velocity is higher than 8 km/h. The running state of the vehicle is acquired thus, and the acquired running state is input to the contents reproduction control portion 20B. The contents reproduction control portion 20B calculates the degree of interference between two pieces of music contents based on parameters decided in accordance with the reproduction environment of the music contents taking the current running state of the vehicle into consideration. The peripheral noise increases when the vehicle is running at a high speed, for example, when the vehicle is running on an expressway or the like. Accordingly, the feature parameters are changed in accordance with the vehicle velocity so as to relax the limitation of the degree of interference.

The feature parameters are changed, for example, by use of a vehicle velocity influence degree table shown in FIG. 7. In this vehicle velocity influence degree table, for example, the feature parameter indicating "violence" is set at "1.0" when the vehicle is parked, "0.8" when the vehicle velocity is not higher than 8 km/h, "0.6" when the vehicle velocity is higher than 8 km/h and not higher than 50 km/h, "0.4" when the vehicle velocity is higher than 50 km/h and not higher than 90 km/h, "0.2" when the vehicle velocity is higher than 90 km/h and not higher than 110 km/h, and "0.0" when the vehicle velocity is higher than 110 km/h.

The degree of interference in consideration of the influence of the vehicle velocity can be obtained by Expression (4).

$$\text{Degree of Interference } (m, n) = \sum_{i,j=1}^{N} S(i) \times F(i, j) \times \alpha(i, m) \times \alpha(j, n) \quad \text{[Expression 4]}$$

Thus, according to the music contents reproducing apparatus 200 in this embodiment, the degree of interference is calculated based on feature parameters decided in accordance with the vehicle velocity so that a music list suitable to the reproduction environment of the music contents reproducing apparatus 200 can be created.

Although the present invention has been described in detail and with reference to its specific embodiments, it is obvious to those skilled in the art that various changes or modifications can be made on the present invention without departing from its spirit and scope.

This application is based on a Japanese patent application (Japanese Patent Application No. 2004-287927) filed on Sep. 30, 2004, contents of which are incorporated herein by reference.

INDUSTRIAL APPLICABILITY

In the music contents reproducing apparatus according to the present invention, music contents to be output to one output portion and music contents to be output to another output portion are selected by use of an interference table which defines the degrees of interference among physical quantities of respective pieces of music contents. Accordingly, the music contents reproducing apparatus has an effect that a plurality of pieces of music contents can be reproduced without causing interference with each other, and is useful as a music contents reproducing apparatus or the like mounted in a car or the like.

The invention claimed is:

1. A music contents reproducing apparatus, comprising:
    a storage unit operable to store physical quantity data about physical quantities of each of the music contents and a table which defines degrees of interference among the physical quantities of the music contents; and
    a control unit operable to select, by using the physical quantity data and the table stored in the storage unit, a first music content to be output to one output portion, the first music content causing substantially no interference with a second music content being reproduced in another output portion.

2. The music contents reproducing apparatus according to claim 1, wherein the control unit selects the first music content so that a degree of interference between the first music content and the second music content is fallen within a predetermined threshold range.

3. The music contents reproducing apparatus according to claim 1, wherein when a headphone or an earphone is connected, the control unit cancels the selection of the first music content.

4. The music contents reproducing apparatus according to claim 1, wherein when a degree of interference among the respective physical quantities exceeds a predetermined range, the volume of the first music content is turned down.

5. The music contents reproducing apparatus according to claim 1, further comprising:
    a creation unit operable to create a music list including a proposed music content(s) to be output to one output portion by using physical quantity data and the table stored in the storage unit, the proposed music content(s) causing no interference or relatively low interference with the music being reproduced in the other output portion in physical quantities; and
    a display unit operable to display the proposed music content(s) included in the music list created by the creation unit; wherein
    the control unit selects the first music content from the proposed music content(s) displayed by the display unit in accordance with a user input.

6. The music contents reproducing apparatus according to claim 5, wherein the proposed music content(s) are displayed in ascending order of a degree of interference.

7. A method of reproducing music contents, comprising:
    providing physical quantity data about physical quantities of each of the music contents and a table which defines degrees of interference among physical quantities of the music contents; and
    selecting, by using the physical quantity data and the table, a first music content to be output to one output portion, the first music content causing substantially no interference with a second music content being reproduced in another output portion.

8. A music contents recording apparatus comprising:
a first input unit configured to receive a first instruction to reproduce a first music selection;
a second input unit configured to receive a second instruction to reproduce a second music selection;
a memory unit configured to store:
  a sort table, the sort table storing values representing qualitative features of music selections including the first music selection and the second music selection; and
  an interference table, the interference table storing values representing a degree of interference between the qualitative features; and
a control unit configured to determine whether the second music selection interferes with the first music selection based on the stored values representing the qualitative features for the first music selection and the second music selection and the stored values representing the degree of interference between the qualitative features and, if so, to cancel reproduction of the second music selection.

9. The apparatus of claim 8, further comprising:
at least one reproduction unit configured to reproduce the first music selection responsive to receipt of the first instruction by the first input unit and to reproduce the second music selection responsive to the control unit determining that the second music selection does not interfere with the first music selection.

* * * * *